(12) United States Patent
Shajenko, Jr. et al.

(10) Patent No.: US 9,043,533 B1
(45) Date of Patent: May 26, 2015

(54) SIZING VOLATILE MEMORY CACHE BASED ON FLASH-BASED CACHE USAGE

(75) Inventors: Peter Shajenko, Jr., Merrimack, NH (US); Kevin S. Labonte, North Grafton, MA (US); Charles H. Hopkins, Upton, MA (US); Thomas E. Linnell, Northborough, MA (US); Feng Zhou, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1119 days.

(21) Appl. No.: 12/826,185

(22) Filed: Jun. 29, 2010

(51) Int. Cl.
*G06F 12/00* (2006.01)
*G06F 12/08* (2006.01)
*G06F 12/02* (2006.01)

(52) U.S. Cl.
CPC ............ *G06F 12/00* (2013.01); *G06F 12/0871* (2013.01); *G06F 12/0246* (2013.01)

(58) Field of Classification Search
CPC .................. G06F 12/0246; G06F 2212/2022; G06F 12/0638; G06F 2212/1032; G06F 11/1008; G06F 11/1048; G06F 12/0866; G06F 11/1068; G06F 12/0868; G06F 11/1072; G06F 3/0688; G06F 11/108; G06F 12/0897; G06F 2211/1009; G06F 2212/214; G06F 2212/222; G06F 2212/225; G06F 2212/261; G06F 2212/7202; G06F 3/0644; G06F 3/0679; G06F 3/0685; G06F 12/0848; G06F 12/0871; G06F 2212/1016; G06F 3/061; G06F 3/0631; G06F 3/068
USPC .............. 711/103, 147, 100, 170, 3, E12.008, 711/105, 118, E12.001, E12.017, E12.019, 711/E12.083, 111, 113, 104, 154, E12.002, 711/102
See application file for complete search history.

(56) References Cited

U.S. PATENT DOCUMENTS

| | | | |
|---|---|---|---|
| 7,130,981 B1* | 10/2006 | Nachenberg | 711/170 |
| 2007/0080830 A1* | 4/2007 | Sacks | 340/995.1 |
| 2008/0140940 A1* | 6/2008 | Gill et al. | 711/136 |
| 2008/0244181 A1* | 10/2008 | Walz et al. | 711/121 |
| 2009/0089500 A1* | 4/2009 | Jiang | 711/113 |
| 2010/0100699 A1* | 4/2010 | Caulkins | 711/171 |
| 2010/0161881 A1* | 6/2010 | Nagadomi et al. | 711/103 |
| 2010/0185816 A1* | 7/2010 | Sauber et al. | 711/122 |
| 2010/0306467 A1* | 12/2010 | Pruthi et al. | 711/114 |
| 2010/0318734 A1* | 12/2010 | Vaid et al. | 711/113 |
| 2010/0332730 A1* | 12/2010 | Royer et al. | 711/103 |
| 2010/0332761 A1* | 12/2010 | Li | 711/129 |
| 2011/0040940 A1* | 2/2011 | Wells et al. | 711/128 |
| 2011/0072194 A1* | 3/2011 | Forhan et al. | 711/103 |
| 2011/0145479 A1* | 6/2011 | Talagala et al. | 711/103 |
| 2011/0202790 A1* | 8/2011 | Rambo et al. | 714/6.12 |
| 2011/0283124 A1* | 11/2011 | Branover et al. | 713/323 |
| 2012/0005668 A1* | 1/2012 | Serizawa et al. | 718/1 |
| 2012/0239853 A1* | 9/2012 | Moshayedi | 711/103 |

* cited by examiner

*Primary Examiner* — Tuan Thai
*Assistant Examiner* — Edward Waddy, Jr.
(74) *Attorney, Agent, or Firm* — Krishnendu Gupta; Jason A. Reyes (57) ABSTRACT

A method is used in sizing volatile memory (VM) cache based on flash-based cache usage. A user selection for a flash-based cache is received. Based on the selection, configuration and sizing factors are provided, by a flash based cache driver, to VM cache size determination logic. Based on the configuration and sizing factors and a sizing formula and rules, a requested VM cache size is produced by the VM cache size determination logic. Based on the requested VM cache size, the VM cache is caused, via VM cache resizing logic, to be resized to the requested VM cache size.

20 Claims, 5 Drawing Sheets

SIZING VOLATILE MEMORY CACHE BASED ON FLASH-BASED CACHE USAGE

BACKGROUND

1. Technical Field

This application relates to sizing volatile memory cache based on flash-based cache usage.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and destage the cached data at different times onto the physical disk drives. As known in the art, the cache used in the data storage system may be implemented using a fast, volatile memory, such as RAM (random access memory).

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

SUMMARY OF THE INVENTION

A method is used in sizing volatile memory (VM) cache based on flash-based cache usage. A user selection for a flash-based cache is received. Based on the selection, configuration and sizing factors are provided, by a flash based cache driver, to VM cache size determination logic. Based on the configuration and sizing factors and a sizing formula and rules, a requested VM cache size is produced by the VM cache size determination logic. Based on the requested VM cache size, the VM cache is caused, via VM cache resizing logic, to be resized to the requested VM cache size.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in sizing volatile memory cache based on flash-based cache usage, which technique may be used to provide, among other things, automated dynamic random access memory (DRAM) cache resizing based on flash-based disk (also referred to as solid state disk or SSD or EFD) cache usage. The DRAM cache and/or the flash-based cache may provide write caching and/or read caching.

In at least some systems, configuring a flash-based cache requires DRAM memory that is already being used by a DRAM cache, and therefore the DRAM cache needs to be reduced in size to free up sufficient DRAM memory for use with the flash-based cache. In such systems, the amount of DRAM memory needed for a flash-based cache depends on the flash-based cache configuration, and the flash-based cache has rules affecting how the DRAM cache should be configured.

In at least one storage system implementation as described below, automated DRAM cache resizing includes receiving a requested flash-based cache configuration from a user and sizing factors provided by a flash-based cache driver; applying a sizing formula and rules, and adding actions to a flash-based cache create ToDo job (e.g., an asynchronous or background job) that correctly reconfigures the DRAM cache (also referred to as volatile memory cache). After the ToDo job completes, the storage system has a properly reconfigured DRAM cache that allows the flash-based cache to function properly and preserves the user's previous DRAM cache settings where possible.

Conventionally, providing DRAM memory for a feature software requires that the DRAM memory be preallocated when the storage system is architected. As a result in a conventional system, this requires preallocating DRAM memory for the maximum possible flash based cache configuration even if little or no flash based cache is used. Thus, conventionally in such a case, the DRAM cache size is reduced without benefit to the user, and on an upgrade, if the user has previously configured all available memory for DRAM cache, the user is forced to manually disable and resize the DRAM cache, which is cumbersome and error prone.

By contrast, in at least some implementations in accordance with the technique as described herein, use of automated DRAM cache resizing can provide one or more of the following advantages: lowering costs by simplifying the upgrade and configuration process, improving memory utilization by allocating DRAM memory where needed, improving reliability of flash-based cache configuration process by reducing or eliminating human errors, and preserving the user's DRAM cache preferences while satisfying the requirements of the flash-based cache.

Figure 1:
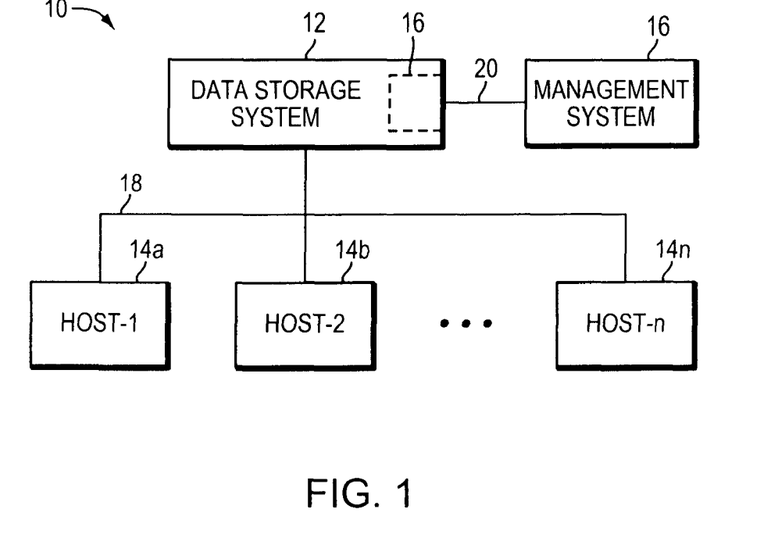
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20 and/or at least partially included in the one or more data storage systems 12. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, at least part of the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
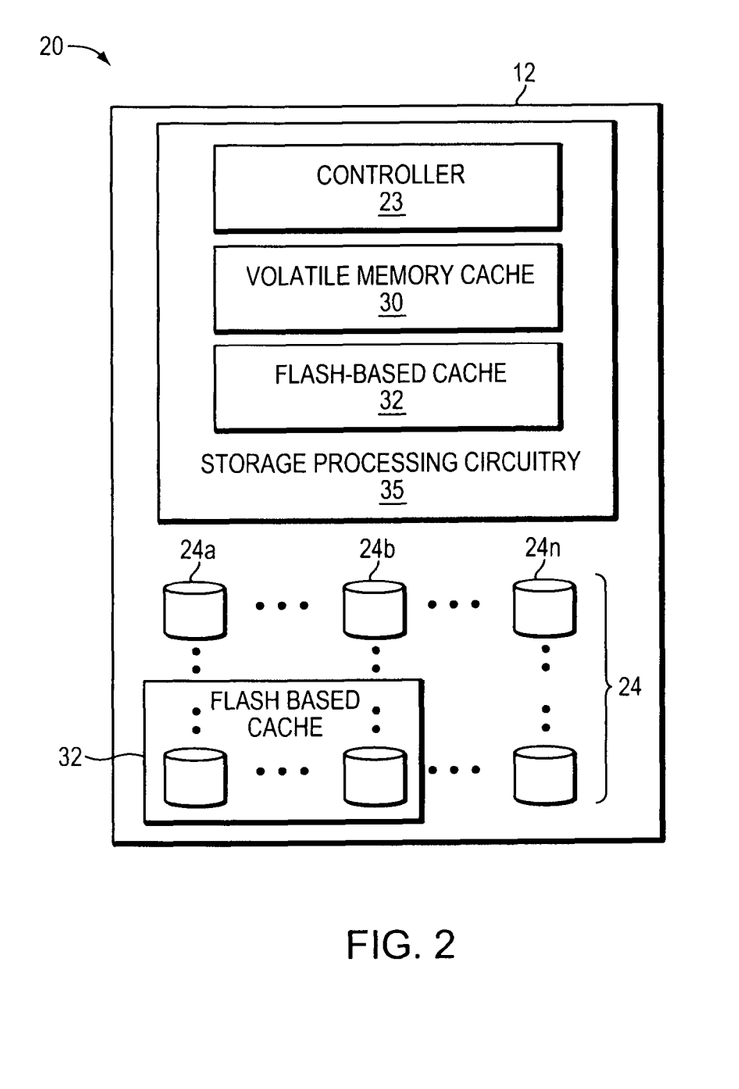
FIGS. 2, 4 are diagrams illustrating in more detail components that may be used in connection with techniques herein.

Referring to FIG. 2, shown is a more detailed representation of components that may be included in an embodiment using the techniques herein. In the example 20, a data storage system 12 may include disks 24 accessed by logical volumes as described above. The data storage system 12 may also include controller 23, a volatile memory cache and a flash-based cache 32. As described in more detail below, one or more of the disks 24 may be, include, or be included in a flash-based disk, and cache 32 may include such flash-based disk.

The data storage system 12 may also include a volatile memory (VM) storage cache 30 including any one or more different types of volatile memory, such as RAM. The flash-based cache 32 is a flash-based memory or solid state drive (SSD) which is non-volatile to store data persistently. The data storage system 12 may utilize a write-back caching technique in which data for a write request is first written to VM cache 30. The VM cache 30 is used to designate some portion of VM used as a write cache although there may be other VM included in the data storage system for other purposes. During normal operation, data from the VM cache 30 may be stored to a portion of the component 32, and the data may be destaged at a later point from the component 32 to disk.

The controller 23 may be configured to perform data storage operations on behalf of the hosts of FIG. 1 during normal operation using the volatile memory storage cache 30, the flash-based cache 32, and the disks 24. As described above during normal operation, when a host sends a request to write data to the data storage system, the controller 23 stores the data of the write request in the VM cache 30. Also, the controller may be configured to perform, for example, as a background process, to copy data from the VM cache to a portion of the component 32. At some point later, the data is destaged or written out to the disks 24 from the component 32.

As will be appreciated by those skilled in the art, the data storage 12 may also include other components than as described for purposes of illustrating the techniques herein.

Figure 3:
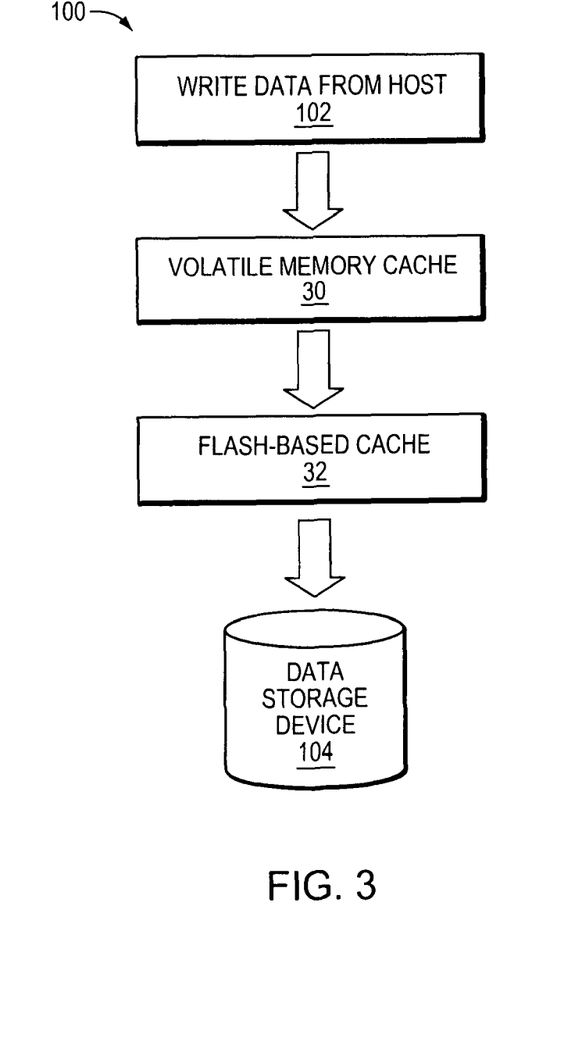
FIG. 3 is a diagram illustrating the flow of data in connection with processing a write request.

Referring to FIG. 3, shown is a flow diagram illustrating the flow of data in the data storage system. During normal processing as described herein, the write data received from the host 102 is cached in the VM cache 30. Data from the VM cache 30 is copied from the component 30 to a portion of the flash-based cache 32. Such copying of data from 30 to 32 during normal operation may be performed, for example, as a background copying operation. At some point later, the data is destaged from the component 32 to the data storage device 104, such as the disks 24 of FIG. 2. The foregoing describes processing during normal operation of the data storage system.

Figure 4:
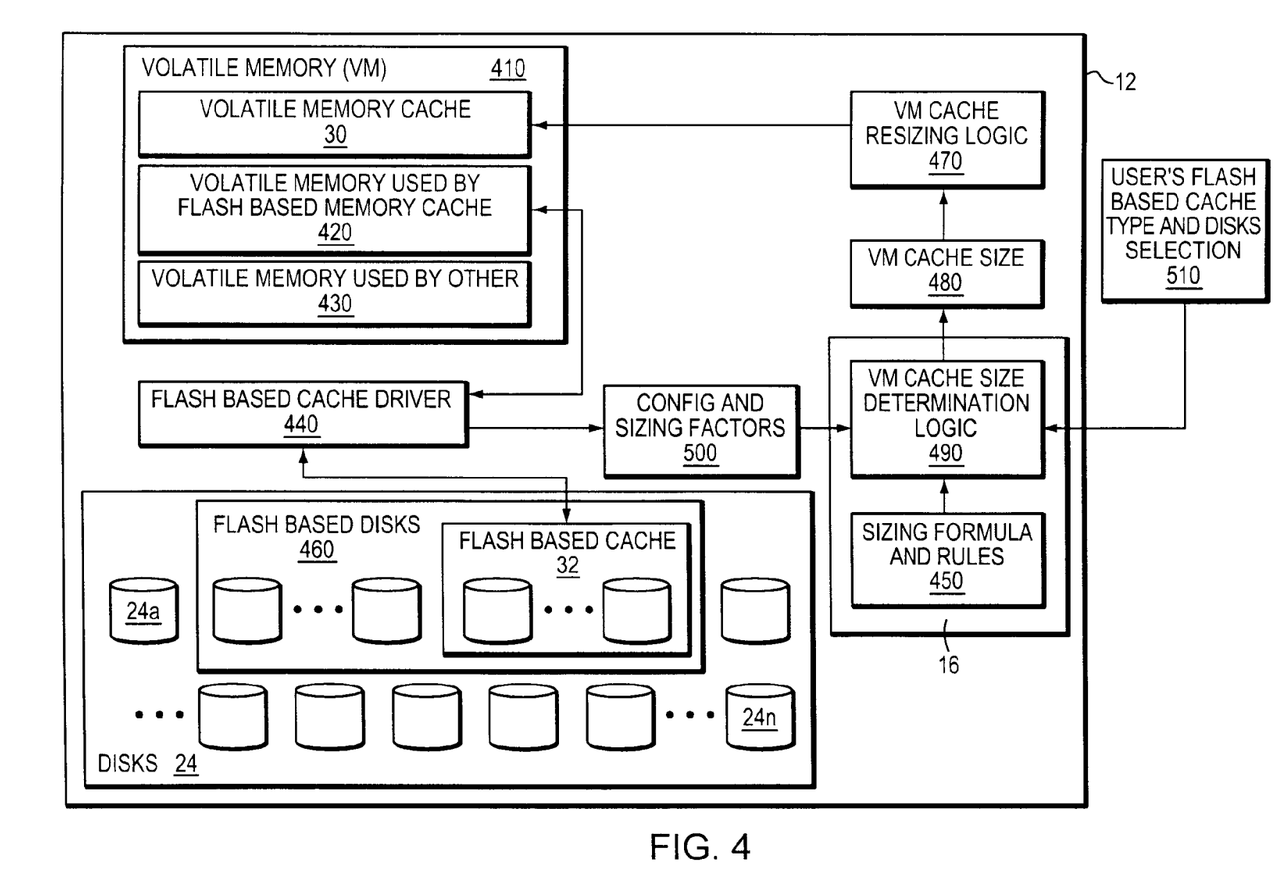

Referring to FIG. 4, shown is an example illustrating one configuration of the VM cache 30 and flash-based cache 32 that may be used in an embodiment with the techniques herein. System 12 has volatile memory (VM) 410 that includes cache 30, VM portion 420 which is used by flash-based cache 32, and VM portion 430 which is used by other logic such as feature software. Disks 24 include flash-based disks 460. System 12 has a flash-based cache driver 440 that helps control cache 32 using VM portion 420.

In the example of FIG. 4, cache 32 is created by using a subset of flash-based disks 460 that would otherwise be used the same way that the rest of disks 24 are used, e.g., for user data. Since the number of disks in cache 32 can be large, e.g., 100 disks, and therefore cache 32 can be large in size, VM portion 420 may need to be large as well to support such a size of cache 32.

In at least some implementations, normally VM cache 30 is the size of VM memory 410 less portion 430 used by other software, e.g., storage processor usage, and this information is available from normal memory system poll data. Flash based cache 32 and its driver 440 require, in the form of VM portion 420, some amount of what would normally be part of VM cache 30 in order to maintain its internal state, e.g., for metadata for cache management, including lookup tables specifying where, if possible, requested data can be found in cache 32, and data usage counters and related information to help determine which data should be present in cache 32. That amount is dependent on the size of flash based cache 32 and can be calculated as:

Size=(Total Flash Based Cache Data Space/Memory Required Ratio)+Memory Extra Size(Sample formula)

In at least some cases, this size should be rounded up to the next highest megabyte boundary. If VM memory 410 lacks available memory of this size, VM cache 30 is disabled, resized to free up an appropriate amount of memory for VM portion 420, and re-enabled.

For example, Memory Extra Size may refer to an amount of memory that driver 440 needs in VM portion 420 regardless of how large cache 32 is, and Memory Required Ratio may specify that for every gigabyte of cache 32, driver 440 needs a specific number of megabytes of memory (e.g., 73 megabytes) in VM portion 420.

Figure 5:
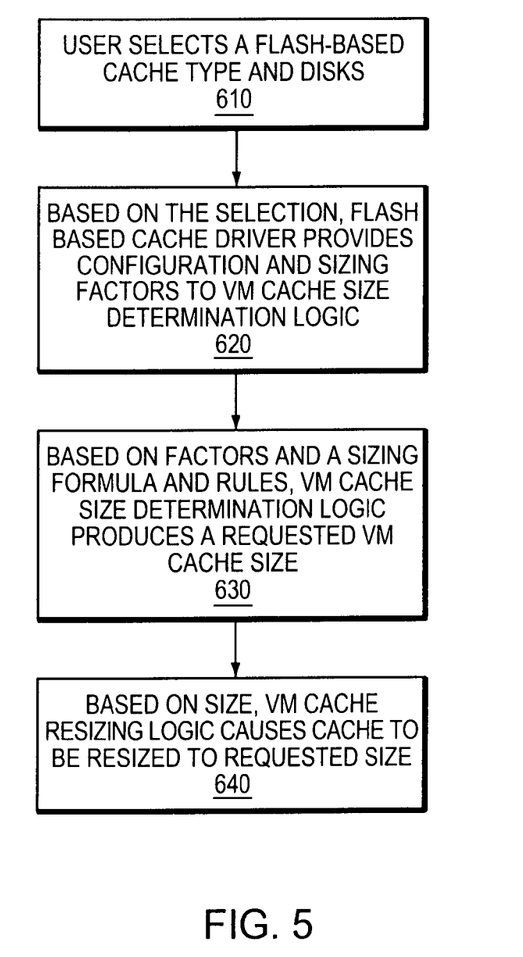
FIG. 5 is a flow diagram illustrating a process that may be used in connection with techniques herein.

Referring now FIGS. 4 and 5, a user selects a flash-based cache type (e.g., read only or read-write) and disks 510 (with a RAID type) (step 610). (In at least some implementations, the selection is from a list of valid configurations provided by driver 440 that can be satisfied by available hardware.) Based on the selection, flash based cache driver 440 provides configuration and sizing factors 500 to VM cache size determination logic 490 (step 620). Based on factors 500 and a sizing formula (e.g., sample formula above) and rules 450, logic 490 produces a requested VM cache size 480 (e.g., after first calculating a size for the flash based cache) (step 630). (In at least some implementations, logic 490 and rules 450 may be included in a portion of management system 16 included in data storage system 12.) Based on size 480, VM cache resizing logic 470 causes cache 30 to be resized to size 480 (step 640).

A table below illustrates an example of some configuration and sizing factors 500 information that may be used by logic 490 and/or driver 440, depending on the implementation. Such information helps prevent implementations of ineffective flash-based cache sizes.

| CX4 Model | Search Sequence | Drive Capacity, GB | # of drives | RAID Configuration | Configuration Mode | Cache Capacity, GB |
|---|---|---|---|---|---|---|
| 120 | 1 | 100 | 2 | R-1 | R-W | 100 |
|  | 2 | 73 | 2 | R-1 | R-W | 73 |
|  | 3 | 100 | 1 | ID | R-O | 100 |
|  | 4 | 73 | 1 | ID | R-O | 73 |
| 240 | 1 | 100 | 4 | R-1 | R-W | 200 |
|  | 2 | 73 | 4 | R-1 | R-W | 146 |
|  | 3 | 100 | 2 | R-1 | R-W | 100 |
|  | 4 | 73 | 2 | ID | R-O | 146 |
|  | 5 | 100 | 1 | ID | R-O | 100 |
|  | 6 | 73 | 1 | ID | R-O | 73 |
| 480 | 1 | 200 | 8 | R-1 | R-W | 800 |
|  | 2 | 100 | 4 | R-1 | R-W | 200 |
|  | 3 | 73 | 4 | R-1 | R-W | 146 |
|  | 4 | 200 | 4 | ID | R-O | 800 |
|  | 5 | 100 | 1 | ID | R-O | 100 |
|  | 6 | 73 | 1 | ID | R-O | 73 |
| 960 | 1 | 400 | 10 | R-1 | R-W | 2000 |
|  | 2 | 200 | 20 | R-1 | R-W | 2000 |
|  | 3 | 200 | 10 | R-1 | R-W | 1000 |
|  | 4 | 100 | 8 | R-1 | R-W | 400 |
|  | 5 | 73 | 8 | R-1 | R-W | 292 |
|  | 6 | 400 | 5 | ID | R-O | 2000 |
|  | 7 | 200 | 10 | ID | R-O | 2000 |
|  | 8 | 200 | 5 | ID | R-O | 1000 |
|  | 9 | 100 | 1 | ID | R-O | 100 |
|  | 10 | 73 | 1 | ID | R-O | 73 |

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in sizing volatile memory (VM) cache based on flash-based cache usage, the method comprising:
   receiving a user selection for a flash-based cache;
   based on the selection, providing, by a flash based cache driver, configuration and sizing factors to VM cache size determination logic;
   producing, by the VM cache size determination logic, a requested VM cache size, wherein producing the requested VM cache size comprises calculating a size of the flash-based cache based on the configuration and sizing factors, further wherein producing the requested VM cache size is dependent on the size of the flash-based cache and a ratio of VM cache required per unit of flash-based cache storage; and
   based on the requested VM cache size, causing, via VM cache resizing logic, the VM cache to be resized to the requested VM cache size.

2. The method of claim 1, wherein configuring the flash-based cache requires volatile memory (VM) that is already being used by a VM cache, and the VM cache needs to be reduced in size to free up volatile memory for use with the flash-based cache.

3. The method of claim 1, wherein the flash-based cache has rules affecting how the VM cache should be configured.

4. The method of claim 1, wherein a requested flash-based cache configuration is provided by a user and sizing factors are provided by a flash-based cache driver to reconfigure the VM cache.

5. The method of claim 1, wherein a sizing formula and rules are applied and actions are added to a flash-based cache create job to reconfigure the VM cache.

6. The method of claim 1, wherein preserving a user's VM cache preferences are preserved while satisfying requirements of the flash-based cache.

7. The method of claim 1, wherein the flash-based cache is created by using a subset of flash-based disks that would otherwise be used for user data.

8. The method of claim 1, wherein the flash based cache and the flash based cache driver require part of the VM cache in order to maintain metadata for cache management.

9. The method of claim 1, wherein VM lookup tables specify where requested data can be found in the flash-based cache.

10. The method of claim 1, wherein an amount of VM needed for the flash based cache is calculated based on total flash based cache data space, memory required ratio, and memory extra size, further wherein the total flash based cache data space relates to the size of the flash based cache, further wherein the memory required ratio relates to the ratio of required VM cache and the size of flash based cache, further wherein the memory extra size relates to an amount of memory required in VM cache regardless of the size of the flash based cache.

11. The method of claim 1, wherein if VM cache is unavailable for the flash based cache, VM cache is disabled, resized, and re-enabled.

12. A system for use in sizing volatile memory (VM) cache based on flash-based cache usage, the system comprising:
   first logic receiving a user selection for a flash-based cache;
   second logic providing, based on the selection, by a flash based cache driver, configuration and sizing factors to VM cache size determination logic;
   third logic producing, by the VM cache size determination logic, a requested VM cache size, wherein producing the requested VM cache size comprises calculating a size of the flash-based cache based on the configuration and sizing factors, further wherein producing the requested VM cache size is dependent on the size of the flash-based cache and a ratio of VM cache required per unit of flash-based cache storage; and
   fourth logic causing, based on the requested VM cache size, via VM cache resizing logic, the VM cache to be resized to the requested VM cache size.

13. The system of claim 12, wherein configuring the flash-based cache requires volatile memory (VM) that is already being used by a VM cache, and the VM cache needs to be reduced in size to free up volatile memory for use with the flash-based cache.

14. The system of claim 12, wherein the flash-based cache has rules affecting how the VM cache should be configured.

15. The system of claim 12, wherein a requested flash-based cache configuration is provided by a user and sizing factors are provided by a flash-based cache driver to reconfigure the VM cache.

16. The system of claim 12, wherein a sizing formula and rules are applied and actions are added to a flash-based cache create job to reconfigure the VM cache.

17. The system of claim 12, wherein preserving a user's VM cache preferences are preserved while satisfying requirements of the flash-based cache.

18. The system of claim 12, wherein the flash-based cache is created by using a subset of flash-based disks that would otherwise be used for user data.

19. The system of claim 12, wherein the flash based cache and the flash based cache driver require part of the VM cache in order to maintain metadata for cache management.

20. The system of claim 12, wherein VM lookup tables specify where requested data can be found in the flash-based cache.

* * * * *